United States Patent [19]

Lawhon

[11] Patent Number: 4,645,831

[45] Date of Patent: Feb. 24, 1987

[54] PROCESS FOR REMOVING UNDESIRABLE CONSTITUENTS FROM WHEAT GLUTEN PRODUCTS

[75] Inventor: James T. Lawhon, College Station, Tex.

[73] Assignee: The Texas A&M University System, College Station, Tex.

[21] Appl. No.: 679,818

[22] Filed: Dec. 10, 1984

[51] Int. Cl.$^4$ ............................................. A23J 1/12
[52] U.S. Cl. ................................. 530/374; 530/375; 530/414; 426/656; 426/425; 426/429; 426/436; 426/481
[58] Field of Search .................... 260/112 R, 112 G; 426/655, 656, 425, 429, 436, 481; 530/370, 372, 374, 375, 412, 414

[56] References Cited

U.S. PATENT DOCUMENTS

| | | | |
|---|---|---|---|
| 3,972,776 | 8/1976 | Vieth | 195/65 |
| 4,107,334 | 8/1978 | Jolly | 426/7 |
| 4,165,391 | 8/1979 | Corbett | 426/580 |
| 4,208,323 | 6/1980 | Murray | 260/112 G |
| 4,254,022 | 3/1981 | Bailey et al. | 260/112 G |
| 4,285,862 | 8/1981 | Murray et al. | 260/112 G |
| 4,420,425 | 12/1983 | Lawhon | 260/123.5 |

OTHER PUBLICATIONS

Kasarda, D. D., et al, "Proteins and the Amino Acid Composition of Wheat Fractions", Wheat-Chemistry and Technology, pp. 227-305.

Blish, et al, Preparation and Determination of Glutenin, vol. II, Mar. 1925, pp. 61-65.

Wheat Protein Isolates Build New Product Opportunities, Bakers Digest, Nov. 8, 1983, p. 10.

*Primary Examiner*—John Kight
*Assistant Examiner*—Nathan M. Nutter
*Attorney, Agent, or Firm*—Arnold, White & Durkee

[57] ABSTRACT

Wheat gluten products may be processed to remove their components which cause undesirable flavors and color. The processing can include extraction with an aqueous solution of alcohol, alkali, or mixtures thereof, and can optionally also include ultrafiltration.

27 Claims, No Drawings

PROCESS FOR REMOVING UNDESIRABLE CONSTITUENTS FROM WHEAT GLUTEN PRODUCTS

BACKGROUND OF THE INVENTION

The present invention relates to wheat gluten, and more specifically to methods of processing wheat gluten products in order to remove components that cause undesirable flavors and color.

Gluten is a mixture of proteins which is present in wheat and, to a lesser extent, in other cereal grains. Gluten is used in making bread because it has an elastic, cohesive nature which permits it to retain carbon dioxide bubbles generated by leavening agents, and therefore to form the framework of the bread.

Wheat flour typically contains about 12% to 13% protein by weight. Gluten represents about 90% of that protein content. The composition of wheat gluten is approximately as follows:

| | |
|---|---|
| Total protein | 80.91% |
| Ether extract | 4.20% |
| Fiber | 2.02% |
| Ash | 2.48% |
| Carbohydrates | 9.44% |
| Total | 99.05% |

The protein component of wheat gluten can be broken down as follows:

| | |
|---|---|
| Gliadin | 39.09% |
| Glutenin | 35.07% |
| Globulin (soluble in 10% salt solution) | 6.75% |
| Total | 80.91% |

These three gluten components have different molecular weights. Gliadins and glutenins have average molecular weights of about 40,000 and 300,000 daltons, respectively, while globulin molecular weights range from about 24,000 to 200,000 daltons.

In addition to its well known use in bread, wheat gluten is used or is being considered for use in a number of other food and industrial applications. For example, wheat gluten proteins are a possible substitute for casein, a relatively expensive product derived from milk. This is an especially important potential use, because casein is used in imitation cheese, and the demand for imitation cheese has increased so dramatically in recent years that casein production cannot keep pace.

As another example, opportunities exist for blending wheat gluten proteins with protein isolates and concentrates from glandless cottonseed and soybean flours to make products that are more nutritious than the individual components by themselves. Combining wheat gluten with soy flour protein in a 30/70 weight ratio gives a product with a protein efficiency ratio of 2.4, which is roughly three times the value for wheat gluten alone.

Unfortunately, wheat gluten products made by some manufacturing processes have some undesirable cereal flavors, excess salts, and undesirable color-causing components which present an obstacle to their use in new applications. The components of wheat gluten which cause these properties present an especially difficult problem in food applications. While some processes have been developed for removing undesirable constituents from other protein sources, those processes are not necessarily transferrable to wheat gluten processing because of differences in overall composition. Processes which could increase the utility of wheat gluten would represent a significant advance in helping meet the nutritional needs of the world.

SUMMARY OF THE INVENTION

Methods in accordance with the present invention help remove undesirable flavor and color-causing components from wheat gluten products. "Wheat gluten product" is used in this patent to mean any product which includes wheat gluten protein. Wheat flour and processed wheat products are examples. Methods in accordance with the present invention can include an extraction procedure and/or a concentration procedure. The extraction procedure can be used alone, as can the concentration procedure, or extraction can be followed by concentration. The extraction procedure can include the steps of suspending a particulate wheat gluten product in a solvent selected from the group consisting of aqueous alkali solutions, aqueous alcohol solutions, and mixtures thereof; and extracting wheat gluten proteins from the suspension. This concentration procedure can include the steps of suspending a particulate wheat gluten product in a solvent to produce a filterable feed, ultrafiltering the filterable feed using a membrane system which has a molecular weight cutoff which will pass the components of the particulate wheat gluten product which cause undesirable flavors and color, thereby producing a permeate and a retentate, and then recovering the retentate.

One specific embodiment of the present invention produces gliadin and glutenin as separate products substantially free of the undesirable flavor and color-causing components. The method of this embodiment includes the steps of suspending a particulate wheat gluten product in an aqueous alcohol solution to form a first suspension; extracting gliadin from the first suspension, leaving behind unextracted materials; suspending the unextracted materials in an aqueous alkali solution to form a second suspension; and then extracting glutenin from the second suspension. The gliadin and glutenin can then be separately suspended in solvents to form a gliadin filterable feed and a glutenin filterable feed, and then separately ultrafiltered as described above.

The methods of the present invention produce a bland wheat gluten product which is substantially free of cereal and salty tastes. Furthermore, based on the research to date, the methods of the present invention appear significantly superior to previously known procedures. Ultrafiltration in accordance with the present invention appears able to recover a higher yield of a purified wheat protein product from an alcoholic extract of wheat gluten than previously known acid precipitation procedures can.

DETAILED DESCRIPTION OF SPECIFIC EMBODIMENTS

The starting material for processing in accordance with the present invention is a particulate wheat gluten product. Wheat flour is an example of such a product. In general, the particulate wheat gluten product to be used can suitably have a particle size such that it will pass through an 80 mesh British Standard screen.

Extraction in accordance with the present invention is done by suspending a particulate wheat gluten product in a solvent such as aqueous alkali solutions, aqueous alcohol solutions, and mixtures thereof. Examples of such solvents are aqueous solutions of methanol (MeOH), ethanol (EtOH), isopropanol (IPOH), sodium hydroxide (NaOH), and potassium hydroxide (KOH). It has been found that when alcohol solutions are used, the following compositions achieve the greatest extraction efficiency.

TABLE 1

| Solvent | Volume Percent |
|---|---|
| MeOH/water | 60/40 |
| EtOH/water | 55/45 |
| IPOH/water | 40/60 |

The pH of the suspension in this step is preferably at least as high as about 9, and more preferably at least as high as about 11. The ratio of solvent to particulate wheat gluten product is preferably between about 7 to 1 and 30 to 1 by weight. Wheat gluten proteins are extracted from the suspension by centrifugation or other methods known to those skilled in the art.

It is possible to repeat the extraction procedure, and it is also possible to use a different solvent in subsequent extractions than was used in the first extraction. For example, gliadin, which is soluble in alcohol but insoluble in neutral salt solutions, could be extracted first using a dilute alcohol solution as a solvent, and then glutenin could be extracted from the remaining unextracted materials using a dilute alkali as a solvent. The two extracts could then be ultrafiltered separately to produce two products with different functional properties, possibly useful in different food or industrial applications.

The extraction product will be rich in the gluten proteins. This product may be used as is or may be ultrafiltered to further purify it. As another option, ultrafiltration can be performed on a particulate wheat gluten product without any extraction.

The ultrafiltration is accomplished by first suspending either the particulate wheat gluten product or the remaining unextracted materials, depending on whether extraction has been performed, with a solvent, preferably water. The resulting suspension can contain both dissolved and undissolved solids, but it is important that the suspension be stirred during ultrafiltration to help maintain a relatively uniform distribution of solids in the feed. Achieving this uniform distribution will be easier if the particulate wheat gluten product is finely ground. Solvents other than water may be used if their capacity to dissolve components of the wheat gluten product exceeds that of water, but they must also be compatible with the ultrafiltration membranes used. The ratio of water to product can be between about 5 to 1 and 60 to 1 by weight, but is preferably about 40 to 1 by weight. The suspension or filterable feed, can have a pH between approximately 3 and 10, preferably about 7.

After a waiting period of 15 to 30 minutes, the filterable feed is ultrafiltered, preferably in a two step procedure. The filtration is through an ultrafiltration membrane having a molecular weight cutoff between about 10,000 and 100,000 daltons, preferably 10,000 to 50,000 daltons, and more preferably about 30,000 daltons. The ultrafiltration membrane system should preferably be a hollow fiber or some other type which has a back flush capability. In such a system, the permeate can be pumped back through the system in a direction opposite to the normal feed flow. This momentary reversal of flow can aid in rapid cleaning of the filter. Suitable ultrafiltration systems are available from Romicon, Inc., Woburn, Mass.

The first phase in the preferred filtration procedure is a constant feed volume or difiltration phase. As some of the suspension passes through the ultrafiltration membrane, dividing the filterable feed into a permeate and a retentate, additional solvent is added to the filterable feed so that the volume of filterable feed remains substantially constant. In other words, solvent is added to the feed at the same rate as which permeate is being produced. This first phase is continued until the total volume of permeate is about 1.0 to 3.0 times the original volume of the filterable feed, preferably about 1.3 to 1.5 times that volume.

Subsequently, the second phase of ultrafiltration begins, in which no solvent is added to the filterable feed. Permeation is permitted to continue until the total permeate equals from about 1.0 to 3.0 times the original filterable feed volume, preferably about 2.0 times that volume. After the filtration is complete, the retentate will be the protein-rich fraction, with many undesirable components having permeated through the membrane. During filtration, it is desirable to heat the filterable feed because increased temperature will generally lower the viscosity of the suspension and therefore increase the permeation rate. However, wheat gluten products often contain significant amounts of starch, and excessive heat can cause the starch to gelatinize. Therefore, it will usually be desirable to keep the temperature below about 140° F.

The retentate can be used in liquid form, or can be dried. As an additional option, reverse osmosis can be used to recover valuable constituents from the permeate while also producing a reusable affluent water.

Another option is to add sodium sulfide ($Na_2SO_3$) to the filterable feed to adjust its pH to about 7.5. This will lower the viscosity of the filterable feed, and therefore will aid permeation and enable the membrane to produce a higher solids content in the retentate. Thus, less water will need to be removed from the retentate by spray drying or other drying methods in order to produce a dry product.

EXAMPLE 1

Twenty-five extraction trials were performed on a clear wheat flour. The flour had a moisture content of 11.17%, and also contained, on a dry weight basis, 2.40% oil, 2.62% total nitrogen, 16.39% protein, 1.50% ash, and 5.43% total sugars. The first 23 trials were performed in a laboratory, using 16 gram, 22 gram, 100 gram, or 200 gram samples of flour. The solvents used included aqueous ethanol, methanol, and isopropanol solutions, as well as dilute solutions of sodium hydroxide, potassium hydroxide, acetic acid ($C_2H_4O_2$), hydrochloric acid (HCl), and sodium benzoate ($C_7H_5NaO_2$).

Two trials were run in a pilot plant (nos. 24 and 25) using 17 pounds of flour and 8 pounds, respectively. Mixtures of isopropanol and dilute sodium hydroxide were used as the solvent in these two trials. The pilot plant extractions were conducted for 40 minutes at 100° to 110° F. Table 2 shows the number of extraction steps used in each trial, the solvents used, the solvent to flour ratio, and the extraction pH.

TABLE 2

Extraction Procedures

| Trial No. | Extraction Steps | Solvents Used | Solvent-to Flour Ratio | Extraction pH |
|---|---|---|---|---|
| 1 | 1st | Dilute NaOH | 7:1 | 12.22 |
|   | 2nd | 70% MeOH | 19:1 |  |
| 2 | Single | Dilute NaOH + MeOH | 25:1 | 12.27 |
| 3 | 1st | 0.05N $C_2H_4O_2$ | 7:1 | 4.42 |
|   | 2nd | 70% MeOH | 19:1 |  |
| 4 | Single | 0.05N $C_2H_4O_2$ + MeOH | 25:1 | 4.40 |
| 5 | Single | Dilute NaOH + IPOH | 25:1 | 12.98 |
| 6 | Single | Dilute NaOH + EtOH | 25:1 | 12.79 |
| 7 | Single | Dilute NaOH + IPOH | 25:1 | 12.46 |
| 8 | Single | Dilute NaOH + IPOH | 25:1 | 12.33 |
| 9 | Single | Dilute NaOH + IPOH | 25:1 | 11:43 |
| 10 | Single | Dilute NaOH + IPOH | 25:1 | 10.65 |
| 11 | Single | Dilute NaOH + IPOH | 25:1 | 9.59 |
| 12 | Single | Dilute NaOH + IPOH | 25:1 | 8.25 |
| 13 | Single | Dilute NaOH + IPOH | 26:1 | 12.60 |
| 14 | Single | Dilute NaOH + EtOH | 26:1 | 12.76 |
| 15 | Single | 0.02N KOH | 25:1 | 11.88 |
| 16 | Single | 0.025N NaOH | 25:1 | 12.12 |
| 17 | Single | 0.005N HCl | 25:1 | 3.66 |
| 18 | Single | 0.005N $C_2H_4O_2$ | 25:1 | 4.80 |
| 19 | Single | Dilute NaOH + $C_2H_4O_2$ | 25:1 | 5.44 |
| 20 | Single | 8% $C_7H_5NaO_2$ | 25:1 | 6.92 |
| 21 | 1st | Dilute NaOH | 10:1 | 11.86 |
|   | 2nd | 70% IPOH | 10:1 | 12.16 |
| 22 | 1st | 65% IPOH | 10:1 | 6.39 |
|   | 2nd | Dilute NaOH | 10:1 | 11.80 |
| 23 | 1st | 70% IPOH + Dilute NaOH | 10:1 | 11.95 |
|   | 2nd | 65% IPOH | 10:1 |  |
| 24 | Single | Dilute NaOH | 20:1 | 12.00 |
| 25 | Single | 35% IPOH + Dilute NaOH | 20:1 | 12.00 |

Table 3 shows the results of the extractions. The extract from trial 25 had the highest extracted protein percentage.

TABLE 3

Extractabilities of solids and nitrogen

| Trial No. | Fraction | Extracted Solids (% of total) | Extracted Protein (% of total) | Protein in solids (NX6.25) (%) |
|---|---|---|---|---|
| 1 | Extract I | 19.40 | 82.35 | 69.77 |
| 2 | Extract I | 19.39 | 78.78 | 66.92 |
| 3 | Extract I | 10.04 | 31.76 | 51.48 |
| 4 | Extract I | 9.13 | 41.90 | 75.27 |
| 5 | Extract I | 18.67 | 74.56 | 65.48 |
| 6 | Extract I | 19.29 | 81.92 | 69.66 |
| 7 | Extract I | 17.09 | 61.02 | 58.48 |
| 8 | Extract I | 12.10 | 38.57 | 52.00 |
| 9 | Extract I | 10.35 | 31.39 | 49.38 |
| 10 | Extract I | 9.68 | 25.43 | 43.11 |
| 11 | Extract I | 8.85 | 20.57 | 38.29 |
| 12 | Extract I | 8.19 | 17.25 | 34.74 |
| 13 | Extract I | 12.52 | 38.83 | 50.85 |
| 14 | Extract I | 18.17 | 74.46 | 66.57 |
| 15 | Extract I | 25.87 | 78.06 | 49.47 |
| 16 | Extract I | 25.89 | 72.80 | 46.11 |
| 17 | Extract I | 9.06 | 16.95 | 30.69 |
| 18 | Extract I | 10.08 | 17.05 | 27.68 |
| 19 | Extract I | 10.16 | 41.30 | 66.59 |
| 20 | Extract I | 22.26 | 55.59 | 40.26 |
| 21 | Extract I | 23.25 | 90.29 | 64.26 |
|   | Extract II | 2.64 | 7.88 | 55.54 |
| 22 | Extract I | 8.44 | 38.80 | 79.35 |
|   | Extract II | 22.38 | 60.11 | 71.03 |
| 23 | Extract I | 20.54 | — | — |
|   | Extract II | 3.76 | — | — |
|   | Extract I & II | 24.30 | 92.43 | 62.25 |
| 24 | Extract I | 11.67 | — | 63.06 |
| 25 | Extract I | 34.48 | 93.01 | 68.42 |

The extracts obtained from these trials were then subject to ultrafiltration. For the laboratory trials (1–23), a MP-1 hollow fiber filtration unit (Nuclepore Corporation, Pleasanton, Calif.) equipped with either a 10,000 or 30,000 molecular weight cutoff membrane was used. The filtration was done at a pH of between 9.5 and 10.0. For the pilot plant extractions (24–25), the ultrafiltration was performed using either a Romicon PM10 or PM30 industrial hollow fiber unit (Romicon, Inc., Woburn, Mass.) at 115° to 127° F. These units had molecular weight cutoffs of 10,000 and 30,000 daltons, respectively. The ultrafiltration retentate from trials 24 and 25 was freeze-dried for analysis.

Table 4 shows the relative amounts of protein recovered by ultrafiltration from the extracts of trials 24 and 25.

TABLE 4

Recovery of Solids and Nitrogen from Wheat Flour Extracts by Ultrafiltration

| Trial No. | Solids in Product (% of flour solids) | Nitrogen in Product (% of flour nitrogen) |
|---|---|---|
| 24 | 10.82 | 40.09 |
| 25 | 18.66 | 74.95 |

Table 5 shows performance data for trials 24 and 25.

TABLE 5

Ultrafiltration Membrane Performance on Clear Wheat Flour Extracts

|  | Extracting Solvent | |
|---|---|---|
|  | 65% IPA & NaOH (Trial 24) | 35% IPA & NaOH (Trial 25) |
| Mean flux (gal/ft²/day) | 43.9 | 29.0 |
| Mean solids retention (%) | 47.8 | 74.2 |
| Mean ash retention (%) | 21.6 | 15.1 |
| Mean total sugars | 35.3 | 56.6 |

TABLE 5-continued

| | Ultrafiltration Membrane Performance on Clear Wheat Flour Extracts | |
|---|---|---|
| | Extracting Solvent | |
| | 65% IPA & NaOH (Trial 24) | 35% IPA & NaOH (Trial 25) |
| retention (%) | | |

Table 6 shows the composition of the protein product recovered from the extracts in trials 24 and 25 by ultrafiltration. As the table shows, the composition of the two products are significantly different. The solvent with the higher alcohol content extracted more oil, less sugar, and slightly more ash. Retention of the oil with the protein lowered the protein content of the product.

TABLE 6

Composition of Protein Products Recovered from Wheat Flour Extractions

| Procedure No. | Moist. % | Oil | Nitrogen Total | Nitrogen Nonprotein | Protein (NX6.25) | Ash | Total sugars | L-scale color Wet | L-scale color Dry |
|---|---|---|---|---|---|---|---|---|---|
| | | | | % Dry wt. basis | | | | | |
| 24 | 1.64 | 24.39 | 10.10 | 0.18 | 63.06 | 4.43 | 4.17 | 46.6 | 73.2 |
| 25 | 1.16 | 6.87 | 10.95 | 0.32 | 68.42 | 3.59 | 9.22 | 61.9 | 72.5 |

EXAMPLE 2

A clear wheat flour was ultrafiltered using a membrane with a 100,000 dalton molecular weight cutoff. The filterable feed was formed by suspending the clear wheat flour in water at a ratio of 40 parts water to 1 part flour by weight. 92.9% of the flour solids were retained by the membrane, and 95.1% of the flour nitrogen was retained. For non-protein nitrogen, the retention figure was 92.5%. The mean flux was only 10.1 gallon per square foot per day, which may be due to the high starch content of the flour. Table 7 shows analytical data on the retentate, and Table 8 shows the nitrogen solubility profile of that product.

TABLE 7

| Moisture content % | Analytical Data on Retentate Content (%, dry weight basis) | | | | | | L-scale color | |
|---|---|---|---|---|---|---|---|---|
| | Nitrogen Total | Nitrogen Non-protein | Protein (NX6.25) | Ash | Total sugars | Oil | Dry | Wet |
| 5.11 | 1.81 | .0810 | 11.3 | 1.26 | 4.17 | — | 86.3 | 65.3 |

TABLE 8

Nitrogen Solubility Profiles of Retentate

| Measured at pH | Nitrogen solubility (%) | | | | | | | | |
|---|---|---|---|---|---|---|---|---|---|
| | 2.0 | 2.5 | 3.0 | 3.5 | 4.0 | 5.5 | 6.0 | 7.0 | 9.0 |
| | 56.98 | 62.78 | 62.32 | 52.42 | 51.44 | 35.42 | 27.02 | 28.30 | 43.01 |

The preceding description is intended to illustrate the present invention, not to give an exhaustive list of all of its possible embodiments. Those skilled in the art will recognize that modifications could be made to the above-described procedures which would remain within the scope and spirit of the present invention.

I claim:

1. A method of processing particulate wheat gluten products which contain wheat gluten proteins and undesirable flavor and color-causing components, including the steps of:
    suspending a particulate wheat gluten product in a solvent selected from the group consisting of aqueous alkali solutions, aqueous alcohol solutions, and mixtures thereof;
    extracting wheat gluten proteins from the suspension;
    dispersing the extracted wheat gluten proteins in a solvent to produce a filterable feed;
    ultrafiltering the filterable feed using an ultrafiltration membrane system which has a molecular weight cutoff which will pass the components of the extracted wheat gluten proteins which cause undesirable flavors and color but will retain the wheat gluten proteins, thereby producing a permeate and a retentate; and
    recovering the retentate.

2. The method of claim 1, where the extraction is repeated, the ratio of solvent to particulate wheat gluten product is about 10 to 1 by weight in each extraction step, and an aqueous alcohol solution is used as the solvent in one extraction while an aqueous alkali solution is used as the solvent in the other extraction.

3. The method of claim 1, where the ratio of solvent to particulate wheat gluten product is between about 25 to 1 and 30 to 1 by weight.

4. The method of claim 1, where the ultrafiltration membrane system has a molecular weight cutoff between about 10,000 and 100,000 daltons.

5. The method of claim 4, where the molecular weight cutoff is between about 10,000 and 50,000 daltons.

6. The method of claim 5, where the molecular weight cutoff is about 30,000 daltons.

7. The method of claim 1, where the ratio of solvent to extracted wheat gluten proteins is between about 5 to 1 and 60 to 1 by weight.

8. The method of claim 7, where the ratio is about 40 to 1 by weight.

9. The method of claim 1, where the ultrafiltration is performed in two sequential phases;
    (a) a first phase in which solvent is added to the filterable feed at the same rate as permeate is being produced, until the total volume of permeate produced is approximately 1.0 to 3.0 times the original volume of the filterable feed; and
    (b) a second phase in which no solvent is added to the filterable feed and ultrafiltration is permitted to continue until the total volume of permeate produced is approximately 1.0 to 3.0 times the original volume of the filterable feed.

10. The method of claim 9, where the ratio in step (a) is between about 1.3 and about 1.5.

11. The method of claim 9, where the ratio in step (b) is about 2.0.

12. A method of processing particulate wheat gluten products which contain wheat gluten proteins and undesirable flavor and color-causing components, including the steps of:
suspending a particulate wheat gluten product in a solvent to produce a filterable feed;
ultrafiltering the filterable feed using an ultrafiltration membrane system which has a molecular weight cutoff which will pass the components of the particulate wheat gluten product which cause undesirable flavors and color but will retain the wheat gluten proteins, thereby producing a permeate and retentate; and
recovering the retentate.

13. The method of claim 12, where the ultrafiltration membrane system has a molecular weight cutoff between about 10,000 and 100,000 daltons.

14. The method of claim 13, where the molecular weight cutoff is between about 10,000 and 50,000 daltons.

15. The method of claim 12, where the ratio of solvent to particulate wheat gluten product is between about 5 to 1 and 60 to 1 by weight.

16. The method of claim 15, where the ratio is about 40 to 1 by weight.

17. The method of claim 12, where the ultrafiltration is performed in two sequential phases:
(a) a first phase in which the solvent is added to the filterable feed at the same rate as permeate is being produced, until the total volume of permeate produced is approximately 1.0 to 3.0 times the original volume of the filterable feed; and
(b) a second phase in which no solvent is added to the filterable feed and ultrafiltration is continued until the total volume of permeate produced is approximately 1.0 to 3.0 times the original volume of the filterable feed.

18. The method of claim 17, where the ratio in step (a) is between about 1.3 and about 1.5.

19. The method of claim 17, where the ratio in step (b) is about 2.0.

20. A method of obtaining gliadin from a particulate wheat gluten product which contains gliadin and undesirable flavor and color-causing components, including the steps of:
suspending a particulate wheat gluten product in an aqueous alcohol solution;
extracting gliadin from the suspension;
dispersing the extracted gliadin in a solvent to produce a filterable feed;
ultrafiltering the filterable feed using an ultrafiltration membrane system which has a molecular weight cutoff which will pass the components which cause undesirable flavors and color but will retain the gliadin, thereby producing a permeate and a retentate; and
recovering the retentate.

21. The method of claim 20, where the ultrafiltration is performed in two sequential phases:
(a) a first phase in which solvent is added to the filterable feed at the same rate as permeate is being produced, until the total volume of permeate produced is approximately 1.0 to 3.0 times the original volume of the filterable feed; and
(b) a second phase in which no solvent is added to the filterable feed and ultrafiltration is permitted to continue until the total volume of permeate produced is approximately 1.0 to 3.0 times the original volume of the filterable feed.

22. A method of obtaining glutenin from a particulate wheat gluten product which contains glutenin and undeisrable flavor and color-causing components, including the steps of:
suspending a particulate wheat gluten product in an aqueous alkali solution;
extracting glutenin from the suspenion;
dispersing the extracted glutenin in a solvent to produce a filterable feed;
ultrafiltering the filterable feed using an ultrafiltration membrane system which has a molecular weight cutoff which will pass the components which cause undesirable flavors and color but will retain the glutenin, thereby producing a permeate and a retentate; and
recovering the retentate.

23. The method of claim 22 where the ultrafiltration is performed in two sequential phases:
(a) a first phase in which solvent is added to the filterable feed at the same rate as permeate is being produced, until the total volume of permeate produced is approximately 1.0 to 3.0 times the original volume of the filterable feed; and
(b) a second phase in which no solvent is added to the filterable feed and ultrafiltration is permitted to continue until the total volume of permeate produced is approximately 1.0 to 3.0 times the original volume of the filterable feed.

24. A method of obtaining gliadin and glutenin from a particulate wheat gluten product which contains gliadin, glutenin, and undesirable flavor and color-causing components, including the steps of:
suspending a particulate wheat gluten product in an aqueous alcohol solution to form a first suspenion;
extracting gliadin from the first suspension, leaving behind unextracted materials;
suspending the unextracted materials in an aqueous alkali solution to form a second suspension;
extracting glutenin from the second suspension;
separately suspending the gliadin and glutenin in solvents to form a gliadin filterable feed and a glutenin filterable feed;
separately ultrafiltering the gliadin filterable feed and glutenin filterable feed using ultrafiltration membrane systems which have molecular weight cutoffs which will pass the components which cause undesirable flavors and color but will retain the gliadin and glutenin, thereby producing a permeate and a retentate for each; and
recovering the rententate for each.

25. The method of claim 24 where each ultrafiltration is performed in two phases:
(a) a first phase in which solvent is added to the filterable feed at the same rate as permeate is being produced, until the total volume of permeate produced is approximately 1.0 to 3.0 times the original volume of the filterable feed; and
(b) a second phase in which no solvent is added to the filterable feed and ultrafiltration is permitted to continue until the total volume of permeate produced is approximately 1.0 to 3.0 times the original volume of the filterable feed.

26. A method of processing particulate wheat gluten products which contain wheat gluten proteins and undesirable flavor and color-causing components, including the steps of:

suspending a particulate wheat gluten product in a solvent selected from the group consisting of aqeuous alkali solutions, aqueous alcohol solutions, and mixtures thereof, the ratio of solvent to particulate wheat gluten product being between about 7 to 1 and 30 to 1 by weight;

extracting wheat gluten proteins from the suspension;

dispersing the extracted wheat gluten proteins in a solvent to produce a filterable feed, the ratio of solvent to extracted wheat gluten proteins being between about 5 to 1 and 60 to 1 by weight;

ultrafiltering the filterable feed using an ultrafiltration membrane system which has a molecular weight cutoff between about 10,000 and 100,000 daltons, thereby producing a permeate and a rententate, the ultrafiltration being performed in two sequential phases, (a) a first phase in which solvent is added to the filterable feed at the same rate as permeate is being produced, until the total volume of permeate produced is between about 1.3 and about 1.5 times the original volume of the filterable feed; and (b) a second phase in which no solvent is added to the filterable feed and ultrafiltration is permitted to continue until the total volume of permeate produced is approximately 2.0 times the original volume of the filterable feed; and recovering the retentate.

27. The method of claim 1 where the wheat gluten product is undefatted.

* * * * *